(12) United States Patent
Kim

(10) Patent No.: US 8,379,265 B2
(45) Date of Patent: Feb. 19, 2013

(54) IMAGE READING APPARATUS AND IMAGE FORMING APPARATUS EMPLOYING THE IMAGE READING APPARATUS

(75) Inventor: Cheoul-Young Kim, Suwon-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 431 days.

(21) Appl. No.: 12/656,567

(22) Filed: Feb. 3, 2010

(65) Prior Publication Data

US 2011/0080598 A1 Apr. 7, 2011

(30) Foreign Application Priority Data

Oct. 7, 2009 (KR) .......................... 10-2009-0095175

(51) Int. Cl.
*G06K 1/00* (2006.01)
(52) U.S. Cl. ....................................................... 358/1.6
(58) Field of Classification Search ................... 358/1.16
See application file for complete search history.

(56) References Cited

U.S. PATENT DOCUMENTS 5,358,239 A * 10/1994 Hario et al. .................... 271/303
2002/0109868 A1 * 8/2002 Yokota et al. .................. 358/497

* cited by examiner

*Primary Examiner* — Saeid Ebrahimi Dehkordy
(74) *Attorney, Agent, or Firm* — Staas & Halsey LLP

(57) ABSTRACT

Disclosed are an image reading apparatus including a guiding unit disposed on a platen glass, and guiding a document transferred by a document transfer device to allow an image of a document to be read by an image sensor disposed at a stationary location. The guiding unit includes: a contacting surface that contacts the platen glass; a reading surface spaced apart upward from the contacting surface and having a flat reading portion corresponding to at least a reading reference location of the image sensor; an access guiding surface guiding the document to the reading surface, tilted downward toward the reading surface, and having an access terminal that is stepped with respect to the reading surface; and a discharge guiding surface guiding the document after the document has passed along the reading surface, and tilting upward from the reading surface without a step.

21 Claims, 4 Drawing Sheets

IMAGE READING APPARATUS AND IMAGE FORMING APPARATUS EMPLOYING THE IMAGE READING APPARATUS

CROSS-REFERENCE TO RELATED APPLICATION

This application claims the benefit of Korean Patent Application No. 10-2009-0095175, filed on Oct. 7, 2009, in the Korean Intellectual Property Office, the disclosure of which is incorporated herein in its entirety by reference.

BACKGROUND

1. Field

The embodiments relate to an image reading apparatus reading an image recorded on a document, and an image forming apparatus employing the image reading apparatus.

2. Description of the Related Art

Image reading apparatuses read an image recorded on a document by irradiating light onto the document and detecting reflected light. The image reading apparatuses use a flatbed method, a document transfer method, or a complex method. According to the flatbed method, a document is placed on a transparent platen glass, and an image of the document is read by using an image sensor moving below the platen glass. According to the document transfer method, an image sensor is stationary, and the image sensor reads an image of a document while the document is transferred through a reading area where the image sensor is located. Alternatively, the image reading apparatuses may use a complex method combining the flatbed method and the document transfer method.

According to the complex method, an image sensor may read an image of a document by using the document transfer method at a location away from a platen glass. According to the document transfer method, the platen glass may extend to a reading area of the image sensor for reading the image. The document may be transferred downward from an upper part of the platen glass, may pass through the reading area by moving along the platen glass, and then may be discharged upward. Here, a discharge guiding unit guiding discharge of the document may be installed on the platen glass. However, a step between the discharge guiding unit and the platen glass may not be completely removed, and thus the discharged document may have a folded front edge or be jammed due to the step.

SUMMARY

Accordingly, it is an aspect of the embodiments to provide an image reading apparatus stably reading an image recorded on a transferred document.

It is another aspect of the embodiments to provide an image reading apparatus stably transferring a document through a platen glass where an image sensor is located, without jamming.

The foregoing and/or other aspects are achieved by providing an image reading apparatus including: a document transfer device transferring a document; a platen glass; an image sensor disposed below the platen glass and having a stationary location so as to read an image from the document transferred by the document transfer device; and a guiding unit disposed on the platen glass, and guiding the document transferred by the document transfer device so as to allow the image of the document to be read by the image sensor, wherein the guiding unit includes: a contacting surface that contacts the platen glass; a reading surface spaced upward from the contacting surface and having a flat reading portion covering at least a reading reference location of the image sensor; an access guiding surface guiding the document to the reading surface, tilted downward toward the reading surface, and having an access terminal that is stepped with respect to the reading surface; and a discharge guiding surface guiding the document after the document has passed along the reading surface, and tilting upward from the reading surface without a step.

There may be provided an image forming apparatus including the above image reading apparatus, and a printing unit printing an image on a sheet of paper according to an electrophotographic process.

A step height of the access terminal with respect to the reading surface and a tilt angle of the access guiding surface at the access terminal may be determined such that a front edge of the document contacts the reading surface at a location over the reading reference location of the image sensor. A distance between the contacting surface and the reading surface may be 0.5 mm or less, and the step height of the access terminal with respect to the reading surface may be 0.1 mm or more. The sum of the step height of the access terminal with respect to the reading surface and the distance between the contacting surface and the reading surface may be 1 mm or less.

The contacting surface may include a non-transparent layer having 30% or less light reflectance, excluding an area corresponding to the reading surface. A surface roughness of the reading surface may be within Ra 1 to 30 μm. At least the reading surface of the guiding unit may have a surface tension of 40 dyne/cm or lower.

The image reading apparatus may further include a pressing unit facing at least the reading surface of the guiding unit to form a space for the document to pass therebetween. The image reading apparatus may further include a transfer device transferring the image sensor along a length direction of the platen glass so as to read the image from the document placed on the platen glass. The guiding unit may be formed by injection molding or extrusion molding.

BRIEF DESCRIPTION OF THE DRAWINGS

The above and other features and advantages will become more apparent by describing in detail exemplary embodiments thereof with reference to the attached drawings in which.

DETAILED DESCRIPTION

Figure 1:
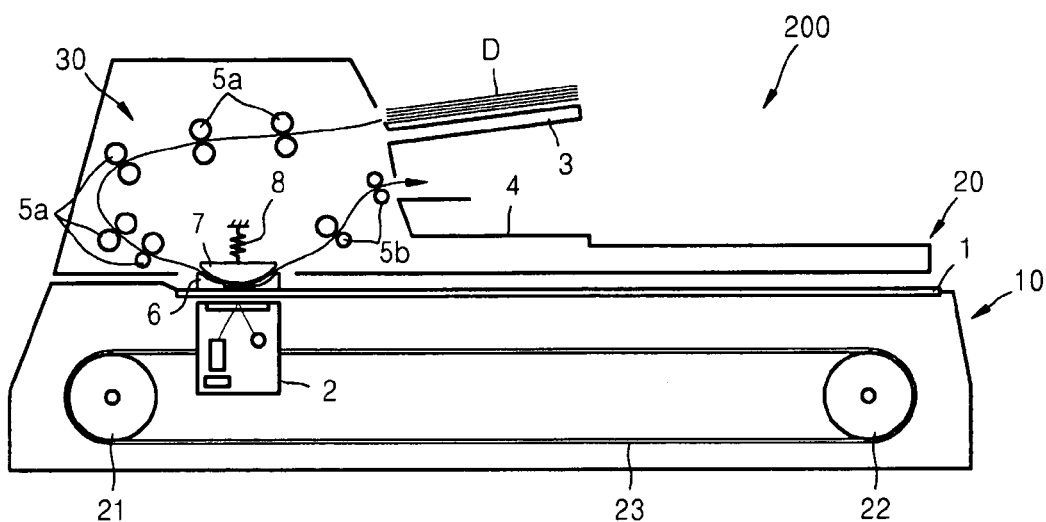
FIG. 1 is a diagram of an image reading apparatus according to an embodiment.

Reference will now be made in detail to the embodiments, examples of which are illustrated in the accompanying drawings, wherein like reference numerals refer to the like elements throughout. The embodiments are described below to explain the present invention by referring to the figures.

FIG. 1 is a diagram of an image reading apparatus 200 according to an embodiment. Referring to FIG. 1, a platen glass 1 and an image sensor 2 are installed in a lower body 10.

The image sensor 2 may be a contact type image sensor (CIS). Alternatively, the image sensor 2 may be a sensor that employs a charge coupled device (CCD).

Figure 2:
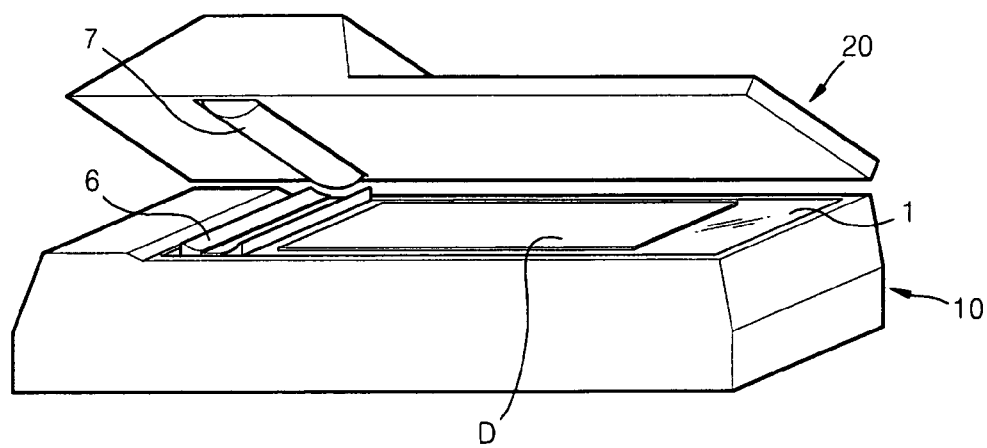
FIG. 2 is a perspective view of the image reading apparatus of FIG. 1 in which an upper body is pivoted with respect to a lower body.

The platen glass 1 is formed of a transparent material, such as glass, through which light penetrates. In order to read an image by using a flatbed method, the platen glass 1 may have a size corresponding to the largest document to be read by the image reading apparatus 200. For example, an upper body 20 may be pivotally installed with respect to the lower body 10, and as shown in FIG. 2, a document D may be placed on the platen glass 1 after assembling the upper body 20. According to a flatbed method, the image sensor 2 may read an image from the document D while moving in a length direction of the platen glass 1, i.e. in a sub-scanning direction of the document D.

An example of a transfer device transferring the image sensor 2 may be a wire 23 that may be moved according to a pair of pulleys 21 and 22. The image sensor 2 may be connected to the wire 23. By rotating one of the pulleys 21 and 22 by using a driving motor (not shown), the image sensor 2 may be transferred in the sub-scanning direction. A timing belt may be used instead of the wire 23. The transfer device transferring the image sensor 2 is not limited to the wire 23.

As shown in FIG. 1, according to a document transfer method, the image reading apparatus 200 may read the image of the document D transferred by a document transfer device 30, while the image sensor 2 is stationary. The document transfer device 30 picks up the document D from a document supply tray 3, transfers the document D to a reading area where the image sensor 2 is located by using a plurality of transfer rollers 5a, and discharges the document D that has been read to a document output tray 4 by using discharge rollers 5b. Although not illustrated in detail, the document transfer device 30 may include an auto-document feeder (ADF) transferring the document D loaded on the document supply tray 3 page by page from the document supply tray 3.

The platen glass 1 may extend above an upper part of the image sensor 2 disposed at the stationary location. The document D is guided by a guiding unit 6 in the reading area. The guiding unit 6 is a light transmitting member and is disposed on the platen glass 1. The guiding unit 6 guides the document D transferred by the document transfer device 30 to the image sensor 2 disposed at the stationary location. The guiding unit 6 may be formed of a material through which 70% or more of visible rays may pass.

Figure 3:
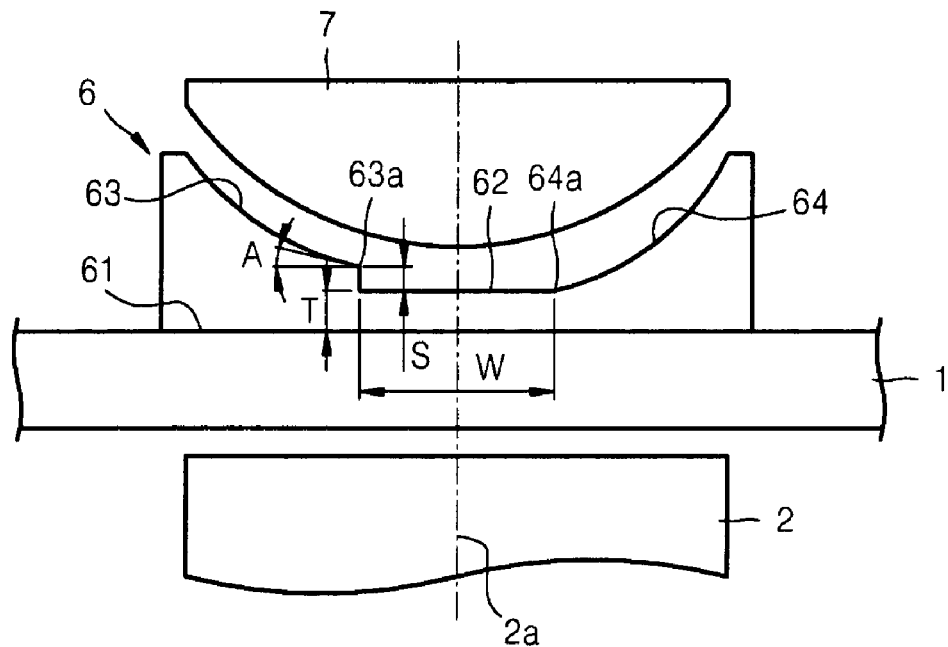
FIG. 3 is a side view illustrating in detail a guiding unit of FIG. 1.

FIG. 3 is a side view illustrating in detail the guiding unit 6 of FIG. 1. Referring to FIG. 3, the guiding unit 6 includes a contacting surface 61 contacting the platen glass 1, and a reading surface 62 spaced apart and upward from the contacting surface 61. The guiding unit 6 also includes an access guiding surface 63 that slopes downward toward the reading surface 62 so as to guide the document D to the reading surface 62. An access terminal 63a of the access guiding surface 63 at the reading surface 62 is stepped upward with respect to the reading surface 62. The guiding unit 6 also includes a discharge guiding surface 64 that guides the document D discharged from the reading surface 62. The discharge guiding surface 64 tilts upward from the reading surface 62 without a step.

Light to read the image of the document D is transmitted to the reading surface 62. The reading surface 62 is a flat surface so that the document may be stably read. In order for the image sensor 2 to stably read the image of the document D, a flat reading portion covering at least a reading reference location 2a of the image sensor 2 needs to be formed in the reading surface 62. The flat reading portion may extend about 1 mm or more and less than 10 mm in each of forward and backward directions with respect to the reading reference location 2a. In other words, a width W of the flat reading portion of the reading surface 62 may be about 2 mm or more, and may not exceed about 20 mm. An interval T between the contacting surface 61 and the reading surface 62, i.e., a thickness of a part through which a light is transmitted, may be about 0.5 mm or less, considering that a depth of focus of a general CIS that may be used as the image sensor 2 is about 1 mm. Since a depth of focus of a CCD sensor is greater than that of a CIS, if a CIS can be used, a CCD sensor can also be used.

When the image sensor 2 reads the image of the document D in the flatbed method, the image sensor 2 reads the image from the document D placed on the platen glass 1. However, when the image sensor 2 reads the image, the image is read from the document D spaced apart from the platen glass 1 by the interval T between the contacting surface 61 and the reading surface 62. In this case, the interval T may be about 0.5 mm and thus the document D is located within an effective range of the depth of focus of the image sensor 2.

The access guiding surface 63 tilts downward toward the reading surface 62, and guides the document D toward the reading surface 62. The discharge guiding surface 64 is connected to the reading surface 62 and tilts upward from the reading surface 62. The discharge guiding surface 64 is connected to the reading surface 62 without a step. Accordingly, the document D having passed through the reading surface 62 may smoothly pass a boundary 64a between the reading surface 62 and the discharge guiding surface 64 and may be discharged without being folded or stuck. An upward tilt angle of the discharge guiding surface 64 may be, for example, within 60° with respect to the reading surface 62. Since the guiding unit 6 is a single transparent member, such a structure may be easily realized via injection molding or extrusion molding. Each of the access guiding surface 63 and the discharge guiding surface 64 may be a tilted surface, a gentle curve, or a combination thereof.

A pressing unit 7 is used so that the document D is not lifted upward from the reading surface 62, and faces at least the reading surface 62 of the guiding unit 6. A spring 8 presses the pressing unit 7 toward the guiding unit 6. A space is formed between the pressing unit 7 and the access guiding surface 63, the reading surface 62, and the discharge guiding surface 64, and the document D is transferred through the space. A surface of the pressing unit 7 facing at least the reading surface 62 is white so that when reading a transparent document, such as an overhead projector (OHP) film, a background may be white. The white surface of the pressing unit 7 may operate as a reference surface compensating for white balance and density. The pressing unit 7 may also be referred to as a reference bar.

As described above, by installing the guiding unit 6 having the access guiding surface 63, the reading surface 62, and the discharge guiding surface 64 on the platen glass 1, a step between the discharge guiding surface 64 and the reading surface 62 may be easily removed. Accordingly, the document D may be smoothly guided by the discharge guiding surface 64 after passing through the reading surface 62. Thus, the document D is prevented from being jammed due to being bent or stuck at the reading area.

Figure 4:
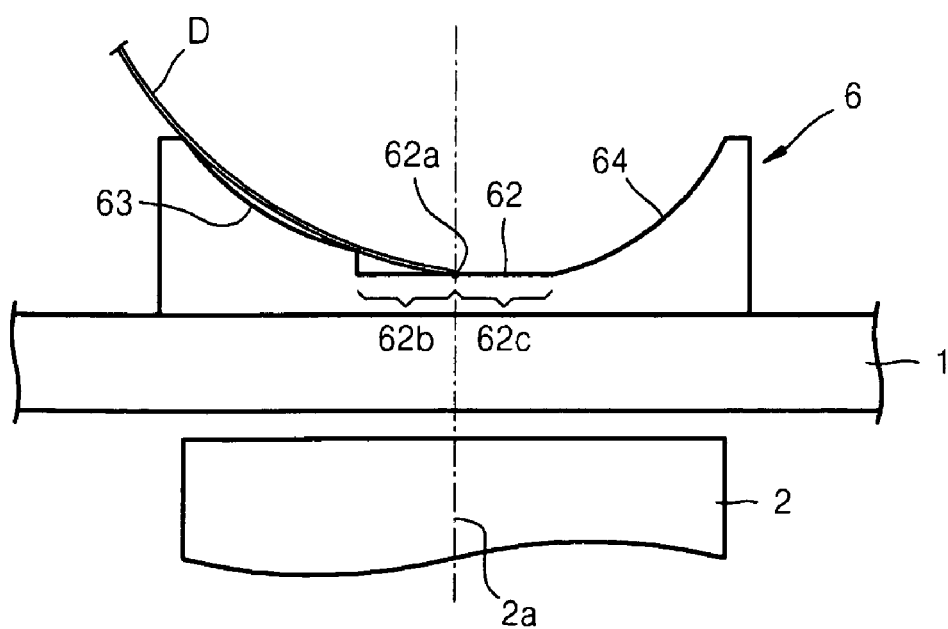
FIGS. 4 and 5 are diagrams for describing a step height and a tilt angle of an access guiding surface of the guiding unit of FIG. 3.
Figure 5:
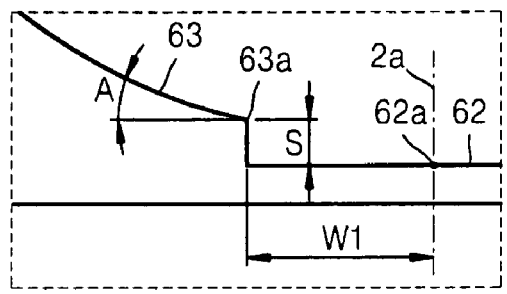

Referring to FIG. 4, the access guiding surface 63 may be shaped in such a way that a location where a front edge of the document D guided by the access guiding surface 63 contacts the reading surface 62 is over a location 62a on the reading surface 62 corresponding to the reading reference location 2a of the image sensor 2. Accordingly, the reading surface 62 may not be damaged or contaminated by the document D. This will now be described in detail.

Generally, the front edge of the document D, e.g., a sheet of paper, is sharp, since the front edge is an edge cut to form the document D. An area that is repeatedly touched by the front edge of the document D may be scratched. Such a scratch may disturb an optical path or diffuse light, thereby disturbing accurate reading of the document D. If the front edge of the document D contacts an access area 62b before the location 62a, the front edge of the document D is transferred to a discharge area 62c while scratching the reading surface 62, thereby leaving a scratch on the reading surface 62. Also at this time, impurities, such as paper dust on the document D, may adhere to the reading surface 62 and contaminate the reading surface 62, thereby preventing accurate reading. Accordingly, the shape of the access guiding surface 63 is configured such that the front edge of the document D contacts the discharge area 62c over the location 62a, and thus an area through which light for reading the image of the document D is transmitted is not damaged by the document D. Also, the location 62a may be prevented from being contaminated by impurities.

The access terminal 63a of the access guiding surface 63 disposed at the reading surface 62 may be stepped with respect to the reading surface 62, and a step height S may be adjusted so as to adjust the location where the front edge of the document D contacts the reading surface 62 to be within the discharge area 62c. Also, the document D, in accessing the reading surface 62, is guided by the vicinity of the access terminal 63a of the access guiding surface 63, and here, by adjusting a tilt angle A of the access guiding surface in the vicinity of the access terminal 63a, the location where the front edge of the document D contacts the reading surface 62 may be adjusted to be within the discharge area 62c.

For example, the step height S of the access terminal 63a with respect to the reading surface 62 may be about 0.1 mm or more. Also for example, the step height S, the tilt angle A, and a length W1 from the location 62a to the access terminal 63a may be such as to satisfy $A \leq \arctan(S/W1)$.

A sum of the step height S and the interval T between the contacting surface 61 and the reading surface 62 may be determined by considering a depth of focus of the image sensor 2. Since a depth of focus of a CIS is about 1 mm, the sum of the step height S and the interval T may be about 1 mm or less. Also, since a depth of focus of a CCD sensor is deeper than that of a CIS, a CCD sensor can be used where a CIS can be used.

The document D may be more smoothly transferred without being folded or stuck as a friction coefficient between the document D and the access guiding surface 63, the reading surface 62, and the discharge guiding surface 64 of the guiding unit 6 is decreased. Accordingly, a surface roughness of the reading surface 62 contacting the front edge of the document D may be within Ra 1 to 30 μm. Here, surface roughness of both the access guiding surface 63 and the discharge guiding surface 64 may also be within Ra 1 to 30 μm. The reading surface 62, the access guiding surface 63, and the discharge guiding surface 64 may achieve this surface roughness by using a physical surface etching method where desired surface roughness is obtained by damaging a surface by ejecting particles having a diameter within 0.5 to 100 μm. Alternatively, a chemical surface etching method using acid may be used. As another alternative, an optical etching method may be used. As yet another alternative, a method of scattering surface roughness forming particles having a diameter within 0.5 to 100 μm on a surface, and coating a surface material on the scattered surface roughness forming particles may be used. The surface roughness forming particles may be polymer particles, such as poly methyl meta acrylate (PMMA) or melamine resins.

In order to prevent surface contamination of the guiding unit 6, specifically contamination of the reading surface 62, at least the reading surface 62 of the guiding unit 6 may have a surface tension of about 40 dyne/cm or below. Generally, materials having similar surface tension are easily mixed or adhered to each other. Contaminants in the air or on a surface of the document D mostly have a diameter of one hundred microns or nanometers. Such contaminants having a minute diameter have a larger volume to surface area ratio, and thus generally have surface tensions above 40 dyne/cm. Accordingly, by having the surface tension of the reading surface 62 be 40 dyne/cm or below, contamination of the reading surface 62 due to impurities may be decreased. Also, the surface tension of the access guiding surface 63 and the discharge guiding surface 64 may also be 40 dyne/cm or below.

In order to realize the guiding unit 6 having such a surface tension, the guiding unit 6 may be formed of at least one of a polypropylene (PP)-based resin, a polyethylene (PE)-based resin, a polyvinyl chloride (PVC)-based resin, a polyvinyl butyral (PVB)-based resin, a fluorine-based resin, silicon, an ethyl-vinyl acetate-based resin, an amid-based resin, or combinations thereof. Alternatively, the guiding unit 6 may be formed by molding a transparent material made of PMMA, poly carbonate (PC), glass, or combinations thereof, into the shape of the guiding unit 6, and by coating with a PP-based resin, a PE-based resin, a PVC-based resin, a PVB-based resin, a fluorine-based resin, silicon, an ethyl-vinyl acetate-based resin, an amid-based resin or combinations thereof onto the surface of the molded translucent material. Alternatively, a film formed of a PP-based resin, a PE-based resin, a PVC-based resin, a PVB-based resin, a fluorine-based resin, silicon, an ethyl-vinyl acetate-based resin, an amid-based resin, or combinations thereof, may be adhered onto a surface to have a surface tension of 40 dyne/cm or below.

A surface of the pressing unit 7 that faces the reading surface 62 may have a surface roughness within Ra 1 to 30 μm, and a surface tension of 40 dyne/cm or below. Processing of the surface of the pressing unit 7 is identical to the processing of the surface of the guiding unit 6.

Figure 6:
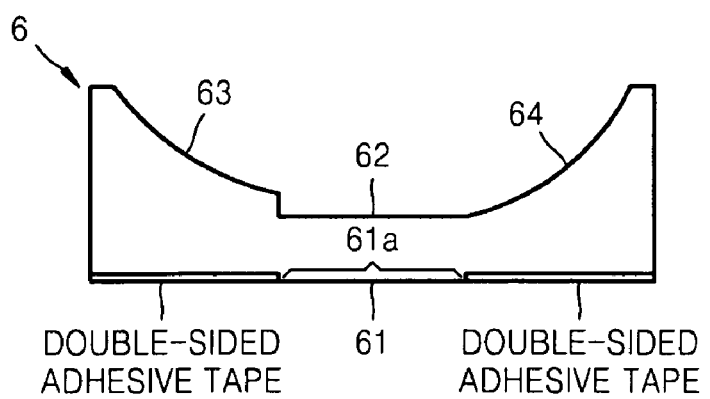
FIG. 6 is a diagram for describing installation of a guiding unit to a platen glass by using an adhering method.

The guiding unit 6 may be adhered to the platen glass 1 by using a double-sided adhesive tape. Here, as shown in FIG. 6, the double-sided adhesive tape may be adhered to the contacting surface 61 excluding an area 61a corresponding to the reading surface 62. Also, in order for the contacting surface 61 to not detach from the platen glass 1, the contacting surface 61 excluding the area 61a may have recesses stepped by a thickness of the double-sided adhesive tape, and the double-sided adhesive tape may be adhered to the recesses.

Figure 7:
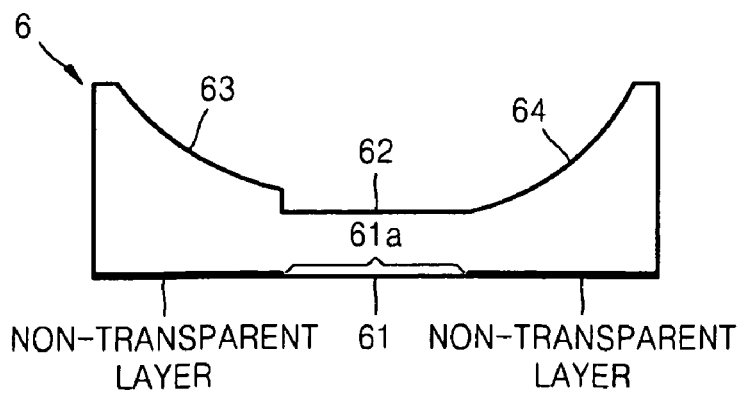
FIG. 7 is a side view of a guiding unit including a non-transparent layer.

Alternatively, as shown in FIG. 7, a non-transparent layer may be prepared on the contacting surface 61 excluding the area 61a. The non-transparent layer may have light reflectance of 30% or below. The non-transparent layer is used so that a light received from surfaces other than the reading surface 62 is not incident on the image sensor 2. The non-transparent layer may be formed by coating a non-transparent material on the contacting surface 61 or by adhering a non-transparent sheet on the contacting surface 61. Here, like FIG. 6, areas of the contacting surface 61 where the non-transparent layer is formed may have recesses stepped by a thickness of the non-transparent layer, so that the contacting surface 61 may not detach from the platen glass 1 as the contacting surface 61 is flat.

Although not illustrated in FIGS. 1 and 2, the guiding unit 6 may be combined to the lower body 10 by using a snap-fit method so that the guiding unit 6 contacts the platen glass 1. However, the guiding unit 6 may be installed on the platen glass 1 by using different methods.

Figure 8:
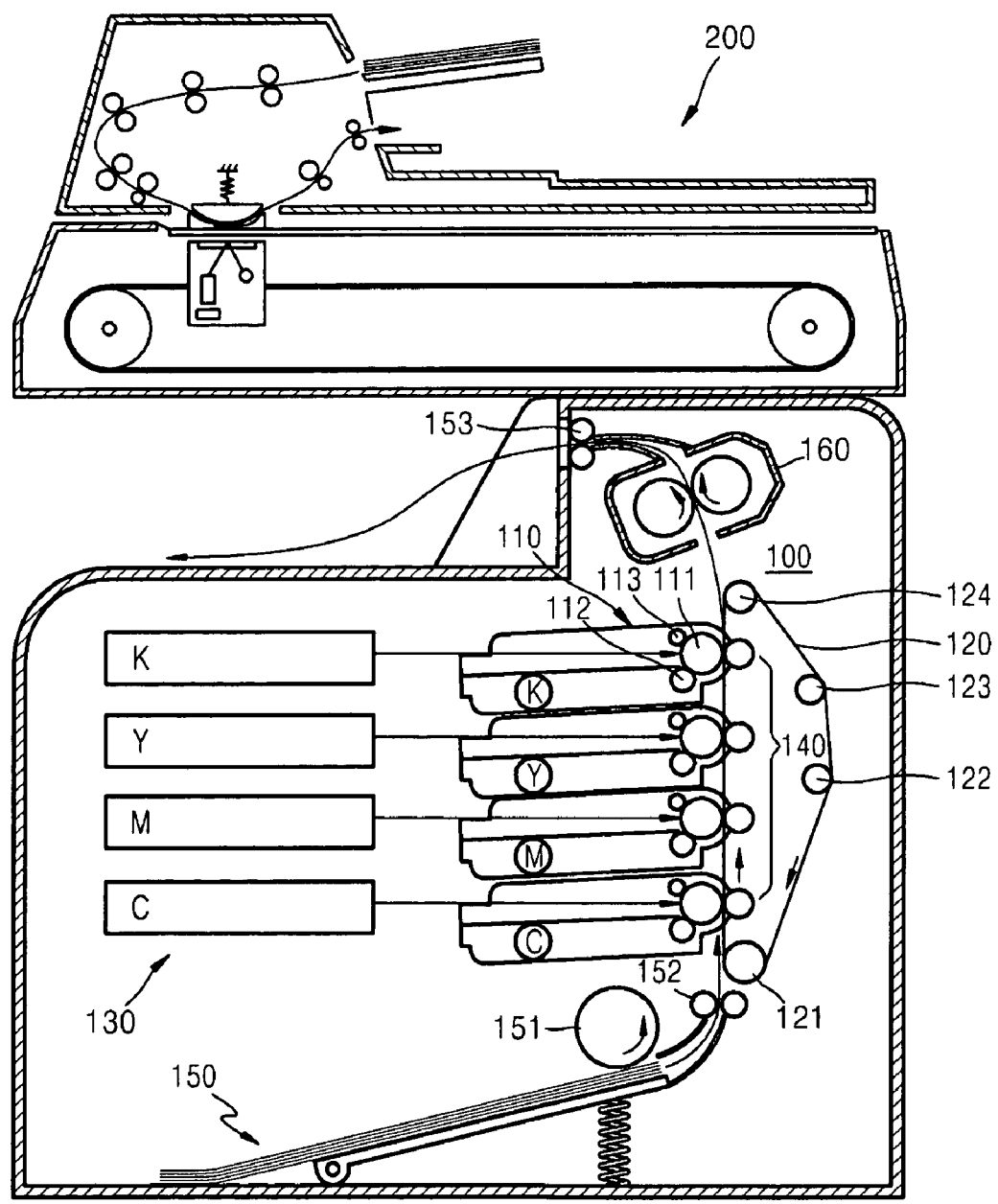
FIG. 8 is a diagram of an image forming apparatus employing an image reading apparatus, according to an embodiment.

FIG. 8 is a diagram of an image forming apparatus employing an image reading apparatus. Referring to FIG. 8, the image forming apparatus may include a printing unit 100 printing an image on a sheet of paper by using an electrophotographic process, and the image reading apparatus 200 illustrated in any of FIGS. 1 through 7 to read an image of a document. The image reading apparatus 200 may be, for example, disposed on an upper part of the printing unit 100. The information read by the image reading apparatus 200 may be transferred to a host (not shown) through a communicating unit, such as a universal serial bus (USB). Alternatively, the image read by the image reading apparatus 200 may be printed on a sheet of paper by the printing unit 100, and thus the image forming apparatus may operate as a copy machine. The image forming apparatus may further include a line controller so as to operate as a facsimile machine that transmits the image read from the document via a public circuit.

In order to print a color image, the printing unit 100 includes four developers 110C, 110M, 110Y, and 100K containing toners having different colors, for example, respectively containing cyan (C), magenta (M), yellow (Y), and black (K) toners, and four exposers 130C, 130M, 130Y, and 130K respectively corresponding to the developers 110C, 110M, 110Y, and 110K.

Each of the developers 110C, 110M, 110Y, and 110K includes a photoconductive drum 111, that is an image carrier, on which an electrostatic latent image is formed, and a developing roller 112 developing the electrostatic latent image. A charge bias is applied to a charge roller 113 so as to charge the circumference of the photoconductive drum 111 to a uniform electric potential. A corona discharger (not shown) may be used instead of the charge roller 113. The developing roller 112 supplies toner to the photoconductive drum 111 by attaching the toner on a circumferential surface thereof. A development bias is applied to the developing rollers 112 so as to supply the toner to the photoconductive drum 111. Although not illustrated in FIG. 8, each of the developers 110C, 110M, 110Y, and 110K may include a supply roller adhering the toner contained in the corresponding developer 110C, 110M, 110Y, or 110K to the developing roller 112, a regulating unit regulating the amount of toner adhered to the developing roller 112, and a mixer transferring the toners to the supply roller and/or the developing roller 112. Also, although not illustrated, each of the developers 110C, 110M, 110Y, and 110K may include a cleaning blade removing the toner adhered to the circumference of the photoconductive drum 111, and a storage space storing the removed toner.

For example, a transfer unit may include a paper conveyor belt 120 and four transfer rollers 140. The paper conveyor belt 120 faces the circumferences of the photoconductive drums 111 exposed outside the developers 110C, 110M, 110Y, and 110K. The paper conveyor belt 120 rotates by being supported by a plurality of supporting rollers 121, 122, 123, and 124. The paper conveyor belt 120 of the embodiment is installed vertically. The four transfer rollers 140 respectively face the photoconductive drums 111 of the developers 110C, 110M, 110Y, and 110K between the paper conveyor belt 120 and the developers 110C, 110M, 110Y, and 110K. A transfer bias is applied to the transfer rollers 140.

Each of the exposers 130C, 130M, 130Y, and 130K scans light corresponding to respective information of images of cyan, magenta, yellow, and black to the corresponding photoconductive drums 111 of the developers 110C, 110M, 110Y, and 110K. A laser scanning unit (LSU) using a laser diode as a light source is used as the exposers 130C, 130M, 130Y, and 130K.

A method of forming a color image will now be described with respect to FIG. 8.

The photoconductive drums 111 are charged to a uniform electric potential according to a charge bias applied to the charge rollers 113. The four exposers 130C, 130M, 130Y, and 130K form electrostatic latent images by scanning light corresponding to respective information of images of cyan, magenta, yellow, and black to the corresponding photoconductive drums 111 of the developers 110C, 110M, 110Y, and 110K. A development bias is applied to the developing rollers 112. Then, toners adhered on the circumferences of the developing rollers 112 adhere to the electrostatic latent images, and thus toner images of cyan, magenta, yellow, and black are formed on the corresponding photoconductive drums 111.

The paper is withdrawn from a cassette 150 by a pickup roller 151. The paper is placed onto the paper conveyor belt 120 by a transfer roller 152. The paper is adhered to a surface of the paper conveyor belt 120 due to an electrostatic force, and is transferred at the same speed as a moving speed of the paper conveyor belt 120.

For example, a front edge of the paper reaches a transfer nip between the photoconductive drum 111 of the developer 110C and the corresponding transfer roller 140 when a front edge of the toner image of cyan formed on the circumference of the photoconductive drum 111 of the developer 110C reaches the transfer nip. When a charge bias is applied to the transfer roller 140, the toner images formed on the photoconductive drum 111 are transferred to the paper. As the paper is transferred, toner images of magenta, yellow, and black respectively formed on the photoconductive drums 111 of the developers 110M, 110Y, and 110K are sequentially transferred to the paper on one another, and thus a color toner image is formed on the paper.

The color toner image transferred to the paper adheres to the surface of the paper due to electrostatic force. A fixing unit 160 fixes the color toner image on the paper by using heat and pressure. Then, the paper on which the color toner image is fixed is discharged out of the image forming apparatus by a discharge roller 153. The toner images formed on the photoconductive drums 111 are directly transferred to the paper without an intermediate transfer process. However, the embodiments are not limited thereto, and the toner images formed on the photoconductive drums 111 may be transferred to the paper after being transferred to an intermediate transfer medium (not shown).

The printing unit 100 of the image forming apparatus according to one embodiment forms a color image by using a single path method, but the embodiments are not limited thereto. The printing unit 100 may form a color image by using a multi path method. Alternatively, the printing unit 100 may form a single color image.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. An image reading apparatus comprising:
a document transfer device transferring a document;
a platen glass;
an image sensor disposed below the platen glass and having a stationary location to read an image from the document transferred by the document transfer device; and
a document guiding unit disposed on the platen glass, and guiding the document transferred by the document transfer device to allow the image of the document to be read by the image sensor,
wherein the document guiding unit is formed of a light transmitting material and comprises:
a contacting surface that contacts the platen glass;
a reading surface spaced upward from the contacting surface and having a flat reading portion covering at least a reading reference location of the image sensor;
an access guiding surface guiding the document to the reading surface, tilted downward toward the reading surface, and having an access terminal that is stepped with respect to the reading surface; and
a discharge guiding surface guiding the document after the document has passed along the reading surface, and tilting upward from the reading surface without a step.

2. The image reading apparatus of claim 1, wherein a step height of the access terminal with respect to the reading surface and a tilt angle of the access guiding surface at the access terminal are determined such that a front edge of the document contacts the reading surface at a location over the reading reference location of the image sensor.

3. The image reading apparatus of claim 2, wherein a distance between the contacting surface and the reading surface is 0.5 mm or less, and the step height of the access terminal with respect to the reading surface is 0.1 mm or more.

4. The image reading apparatus of claim 3, wherein the sum of the step height of the access terminal with respect to the reading surface and the distance between the contacting surface and the reading surface is 1 mm or less.

5. The image reading apparatus of claim 1, wherein the contacting surface includes a non-transparent layer having 30% or lower light reflectance excluding an area corresponding to the reading surface.

6. The image reading apparatus of claim 1, wherein a surface roughness Ra of the reading surface is between 1 and 30 µm.

7. The image reading apparatus of claim 1, wherein the reading surface of the document guiding unit has a surface tension of 40 dyne/cm or less.

8. The image reading apparatus of claim 1, further comprising a pressing unit facing the reading surface of the document guiding unit to form a space for the document to pass therebetween.

9. The image reading apparatus of claim 1, further comprising a transfer device transferring the image sensor along a length direction of the platen glass to read the image from the document placed on the platen glass.

10. The image reading apparatus of claim 1, wherein the document guiding unit is formed by injection molding or extrusion molding.

11. An image forming apparatus comprising:
the image reading apparatus of claim 1; and
a printing unit printing an image on a sheet of paper according to an electrophotographic process.

12. The image forming apparatus of claim 11, wherein a step height of the access terminal with respect to the reading surface and a tilt angle of the access guiding surface at the access terminal are determined such that a front edge of the document contacts the reading surface at a location over the reading reference location of the image sensor.

13. The image forming apparatus of claim 12, wherein a distance between the contacting surface and the reading surface is 0.5 mm or less, and the step height of the access terminal with respect to the reading surface is 0.1 mm or more.

14. The image forming apparatus of claim 13, wherein the sum of the step height of the access terminal with respect to the reading surface and the distance between the contacting surface and the reading surface is 1 mm or less.

15. The image forming apparatus of claim 11, wherein the contacting surface includes a non-transparent layer having 30% or lower light reflectance excluding an area corresponding to the reading surface.

16. The image forming apparatus of claim 11, wherein a surface roughness Ra of the reading surface is between 1 and 30 µm.

17. The image forming apparatus of claim 11, wherein the reading surface of the document guiding unit has a surface tension of 40 dyne/cm or less.

18. The image forming apparatus of claim 11, further comprising a pressing unit facing the reading surface of the document guiding unit to form a space for the document to pass therebetween.

19. The image forming apparatus of claim 11, further comprising a transfer device transferring the image sensor along a length direction of the platen glass to read the image from the document placed on the platen glass.

20. The image forming apparatus of claim 11, wherein the document guiding unit is formed by injection molding or extrusion molding.

21. The image reading apparatus of claim 1, wherein the contacting surface includes a double-sided adhesive tape excluding an area corresponding to the reading surface.

* * * * *